(12) United States Patent
Sheckells et al.

(10) Patent No.: US 10,976,743 B2
(45) Date of Patent: *Apr. 13, 2021

(54) TRAJECTORY GENERATION USING MOTION PRIMITIVES

(71) Applicant: Zoox, Inc., Foster City, CA (US)

(72) Inventors: Matthew Sheckells, Baltimore, MD (US); Timothy Caldwell, Mountain View, CA (US); Marin Kobilarov, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 16/537,858

(22) Filed: Aug. 12, 2019

(65) Prior Publication Data

US 2019/0361450 A1 Nov. 28, 2019

Related U.S. Application Data

(63) Continuation of application No. 15/843,596, filed on Dec. 15, 2017, now Pat. No. 10,379,538.

(60) Provisional application No. 62/474,019, filed on Mar. 20, 2017, provisional application No. 62/474,185, filed on Mar. 21, 2017.

(51) Int. Cl.
| | |
|---|---|
| *G05D 1/02* | (2020.01) |
| *G05D 1/00* | (2006.01) |
| *B60W 10/20* | (2006.01) |
| *B60W 40/00* | (2006.01) |
| *B60W 30/10* | (2006.01) |
| *B60W 40/072* | (2012.01) |

(52) U.S. Cl.
CPC ............ *G05D 1/0212* (2013.01); *B60W 10/20* (2013.01); *B60W 30/10* (2013.01); *B60W 40/072* (2013.01); *G05D 1/0088* (2013.01); *B60W 2552/20* (2020.02); *G05D 2201/0213* (2013.01)

(58) Field of Classification Search
CPC ............ B60W 10/20; B60W 2552/20; B60W 2552/30; B60W 30/10; B60W 40/072; B60W 60/0011; G05D 1/0088; G05D 1/0212; G05D 1/0217; G05D 2201/0213
See application file for complete search history.

(56) References Cited

U.S. PATENT DOCUMENTS

| | | | |
|---|---|---|---|
| 5,913,376 A * | 6/1999 | Takei ................... | G05D 1/0261 180/168 |
| 6,092,010 A * | 7/2000 | Alofs ................... | G05D 1/0274 701/23 |

(Continued)

*Primary Examiner* — Tyler J Lee
(74) *Attorney, Agent, or Firm* — Lee & Hayes, P.C.

(57) ABSTRACT

In autonomous driving, it is often useful to plan trajectories in a curvilinear coordinate frame with respect to some reference trajectory, like a path produced by a hi-level route planner. This disclosure includes techniques for developing efficient approximate path coordinate motion primitives appropriate for fast planning in autonomous driving scenarios. These primitives are approximate in that particular quantities, like the path length, acceleration, and track offset trajectory, are known with some degree of certainty, and values that depend on the curvature of the reference path can be bound. Such approximate motion primitives can be used to control the autonomous vehicle to follow the trajectory in an environment.

18 Claims, 7 Drawing Sheets

(56) References Cited

U.S. PATENT DOCUMENTS

| | | | | |
|---|---|---|---|---|
| 6,134,486 | A * | 10/2000 | Kanayama | G05D 1/0212 701/23 |
| 8,131,415 | B2 * | 3/2012 | Peake | G05D 1/0212 701/25 |
| 8,755,966 | B2 * | 6/2014 | Halder | G05D 1/0278 701/25 |
| 9,020,757 | B2 * | 4/2015 | Peake | B62D 6/00 701/500 |
| 9,321,461 | B1 * | 4/2016 | Silver | G08G 1/16 |
| 9,562,779 | B2 * | 2/2017 | Lynch | G05D 1/0274 |
| 9,731,755 | B1 * | 8/2017 | Moshchuk | B62D 6/00 |
| 9,804,603 | B1 | 10/2017 | Yegerlehner | |
| 2005/0240334 | A1 * | 10/2005 | Matsumoto | B60K 31/0083 701/93 |
| 2006/0041372 | A1 * | 2/2006 | Kubota | G01C 21/3697 701/532 |
| 2008/0046145 | A1 * | 2/2008 | Weaver | B60T 7/22 701/41 |
| 2009/0088941 | A1 * | 4/2009 | Tsuchiya | B60K 31/0083 701/93 |
| 2009/0198426 | A1 * | 8/2009 | Yasui | B60W 10/184 701/70 |
| 2009/0319139 | A1 * | 12/2009 | Kondou | F16H 59/66 701/55 |
| 2011/0010131 | A1 * | 1/2011 | Miyajima | G01C 21/26 702/181 |
| 2011/0087415 | A1 * | 4/2011 | Yokoyama | B60W 10/184 701/71 |
| 2011/0178689 | A1 * | 7/2011 | Yasui | B60W 30/14 701/70 |
| 2015/0094943 | A1 * | 4/2015 | Yoshihama | B60W 30/09 701/301 |
| 2015/0151725 | A1 * | 6/2015 | Clarke | B60W 30/0953 701/28 |
| 2015/0197247 | A1 * | 7/2015 | Ichinokawa | B60W 30/143 701/93 |
| 2016/0313737 | A1 | 10/2016 | Berkemeier | |
| 2017/0008521 | A1 | 1/2017 | Braunstein et al. | |
| 2017/0247054 | A1 | 8/2017 | Lee et al. | |
| 2017/0357262 | A1 | 12/2017 | Dix et al. | |
| 2018/0181132 | A1 | 6/2018 | Kunihiro et al. | |
| 2018/0217612 | A1 | 8/2018 | Vladimerou et al. | |

* cited by examiner

TRAJECTORY GENERATION USING MOTION PRIMITIVES

CROSS REFERENCE TO RELATED APPLICATIONS

This is a continuation application which claims priority to commonly assigned, co-pending U.S. patent application Ser. No. 15/843,596, filed Dec. 15, 2017, which application claims priority filing benefit from U.S. Provisional Patent Application No. 62/474,019, filed Mar. 20, 2017, and 62/474,185, filed Mar. 21, 2017. Application Ser. No. 15/843,596, 62/474,019 and 62/474,185 are fully incorporated herein by reference.

BACKGROUND

Various methods, apparatuses, and systems are utilized by autonomous vehicles to guide such autonomous vehicles through environments including various static and dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, generating routes for an autonomous vehicle can rely on computationally intensive coordinate transformations or on solving computationally intensive boundary value problems, which can be inefficient in a resource-limited or a time-limited environment

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
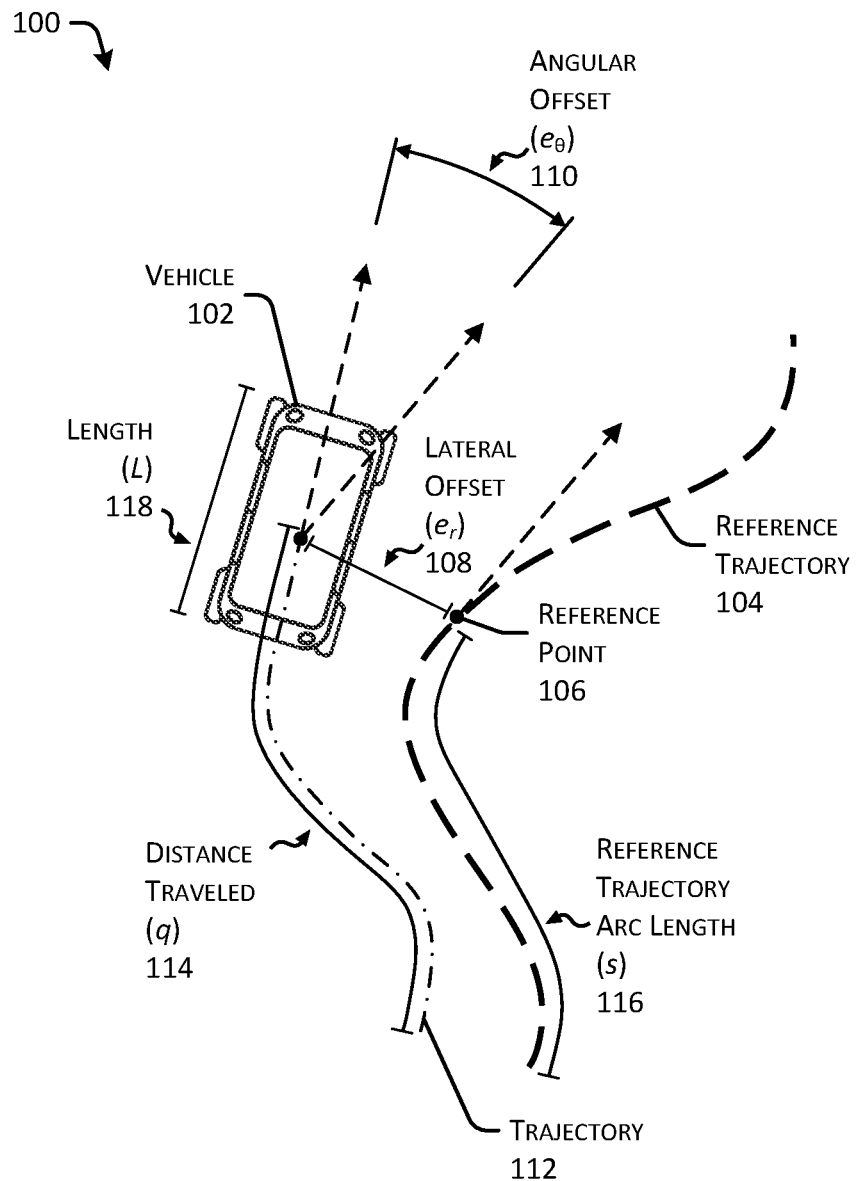
FIG. 1 depicts an example environment including a trajectory of a vehicle relative to a reference trajectory, in accordance with embodiments of the disclosure.

This disclosure describes methods, apparatuses, and systems for determining a trajectory for an autonomous vehicle using motion primitives. In some instances, a decision planner component of an autonomous vehicle, for example, can receive a reference trajectory, which may correspond to an ideal route for an autonomous vehicle to traverse through an environment, such as a center of a road segment. The use of motion primitives can be used to achieve such a trajectory. However, a full library of precomputed motion primitives cannot be used, as dynamics of unknown curvatures may be too computationally intensive to be feasible, especially in those scenarios involving autonomous driving.

In various examples described herein, an approximate motion primitive may be determined, as opposed to an ideal motion primitive. Such a motion primitive may be created by parsing the reference trajectory into segments having a positive curvature value, a negative value, or no curvature and defining a heuristically defined primitive approximation. Further, a lateral offset of the autonomous vehicle (also referred to as a vehicle or robot) can be determined relative to the reference trajectory, and the lateral offset can be parameterized as a constant lateral offset or as a cubic function. An acceleration of the autonomous vehicle can be parameterized as a constant value over the particular segment. Based on parameterizing acceleration as piece-wise constant and a cubic lateral offset, an upper bound and a lower bound for an arc length of a segment of the reference trajectory can be determined. A travel distance of the autonomous vehicle with respect to the segment can be determined based at least in part on the lateral offset and the upper and lower bounds of the arc length of the segment of the reference trajectory. In some instances, the motion primitives can be determined heuristically as a function of upper and lower bounds.

The use of motion primitives in connection with trajectory generation herein can improve a functioning of a computing device by providing a robust, and fast, approximation of arc length(s) of one or more segments. For example, in an experimental validation of the techniques discussed herein, arc lengths determined heuristically are compared to the true arc length. Such a comparison illustrates a small error value (e.g., on the order of 4%) with improved processing time. For example, using the techniques discussed herein, an average time to compute bounds of an arc length was 0.26 milliseconds, while an average time to integrate over a segment of a reference trajectory using a Euler integration timestep of 1 millisecond was 285 milliseconds. Thus, determining the arc length heuristically can be orders of magnitude (e.g., 1000 times) faster than prior art techniques. Accordingly, in some instances, the motion primitives discussed herein may require less processing power, and/or may require less memory than conventional trajectory generation techniques. These and other improvements to the functioning of the computer are discussed herein.

The methods, apparatuses, and systems described herein can be implemented in a number of ways. Example implementations are provided below with reference to the following figures. Although discussed in the context of an autonomous vehicle, the methods, apparatuses, and systems described herein can be applied to a variety of systems using route planning and/or trajectory generation, and is not limited to autonomous vehicles. In another example, the methods, apparatuses, and systems may be utilized in an aviation or nautical context. Additionally, the techniques described herein may be used with real data (e.g., captured using sensor(s)), simulated data (e.g., generated by a simulator), or any combination of the two.

FIG. 1 depicts an example environment 100 including a trajectory 112 of a vehicle 102 relative to a reference trajectory 104, in accordance with embodiments of the disclosure.

The reference trajectory 104 can correspond to a centerline of a road segment or any drivable surface. In some instances, the reference trajectory 104 can be generated by or received by a planner system of the vehicle 102. With respect to a reference point 106 of the reference trajectory 104, a position of the vehicle 102 can be defined at least in part by a lateral offset ($e_r$) 108 relative to the reference trajectory 104 and an angular offset ($e_\theta$) 110. In some instances, the angular offset 110 can correspond to a difference in an angle between an orientation and/or direction of travel of the vehicle 102 and a vector associated with a direction of the reference trajectory 104 at the reference point 106.

Motion of the vehicle 102 can correspond to the trajectory 112. In some instances, the trajectory 112 can represent the actual path traversed by the vehicle 102. In some instances, a distance traveled (q) 114 corresponds to a length of the trajectory 112 associated with one or more segments of the reference trajectory 104.

One or more segments of the reference trajectory 104 can be associated with a reference trajectory arc length (s) 116. In some instances, for ease of comparison, the distance traveled 114 and the reference trajectory arc length 116 can be associated with the same segments(s) of the reference trajectory 104, although it can be understood in the context of this disclosure that the distance traveled 114 and the reference trajectory arc length 116 may correspond to different measured values.

In some instances, the vehicle 102 can be associated with a length (L) 118.

In some instances, a state of vehicle 102 can be defined as being associated with an arc length 116 along the reference trajectory, the lateral offset 108, the angular offset 110, and a velocity in a path-centric coordinate system (e.g., represented in the environment 100). That is, a path-centric coordinate system can represent a coordinate system whereby a position of the vehicle 102 can be defined or expressed (at least in part) relative to a reference trajectory.

The coordinate system and the generation of motion primitives with respect to the coordinate system is further discussed below in connection with FIG. 3.

Figure 2:
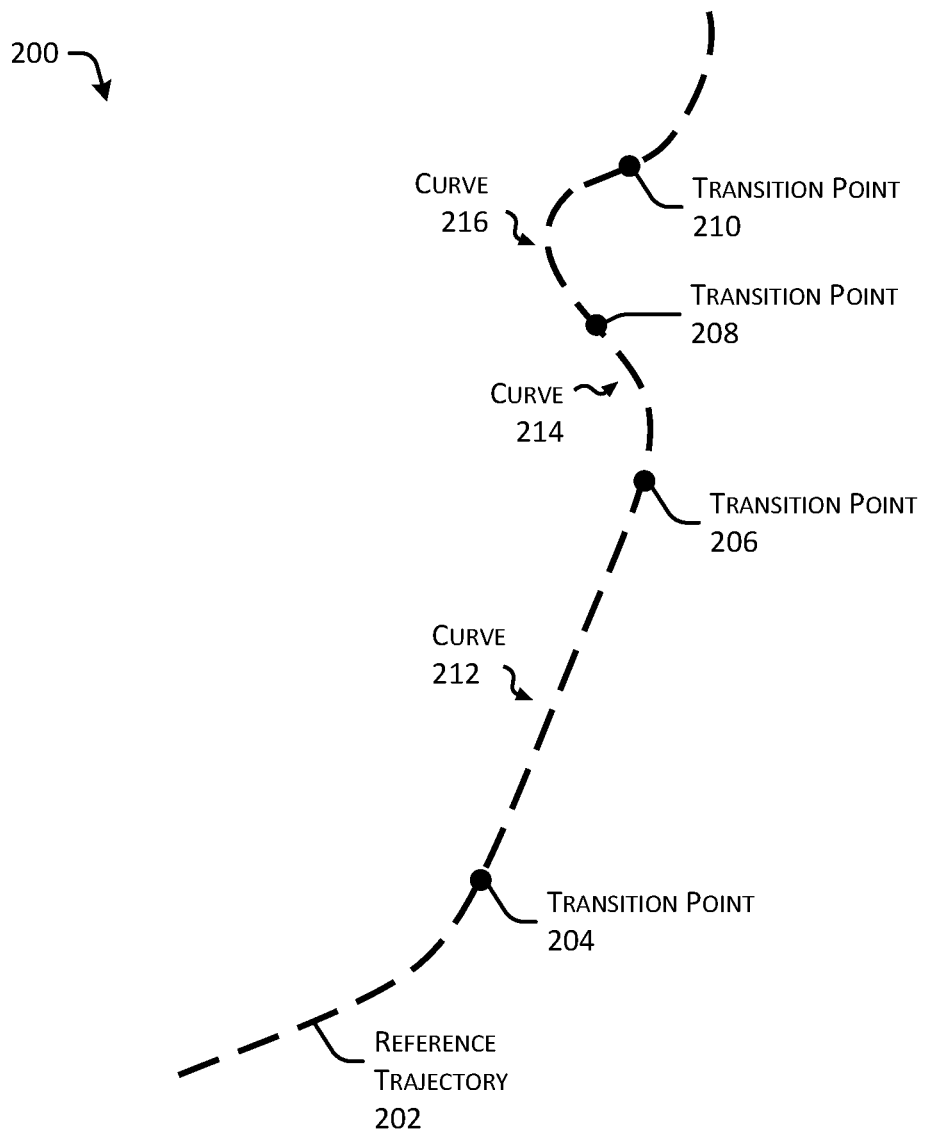
FIG. 2 depicts another example environment including a reference trajectory associated with transition points distinguishing segments having various curvature values, in accordance with embodiments of the disclosure.

FIG. 2 depicts an example environment 200 including a reference trajectory associated with transition points distinguishing segments having various curvature values, in accordance with embodiments of the disclosure.

A reference trajectory 202 can correspond to a path for an autonomous vehicle to follow while traversing through the environment 200. In some instances, the reference trajectory 202 can correspond to a centerline of a road segment, for example, or any other drivable surface. As can be understood in the context of this disclosure, portions of the reference trajectory 202 can correspond to regions having a positive curvature, a negative curvature, or zero curvature, for example, relative to a frame of reference. As discussed herein, a positive curvature can correspond to a region of the reference trajectory 202 that curves to the right, while a negative curvature can correspond to a region of the reference trajectory 202 that curves to the left. Similarly, a region having zero curvature can correspond to a region of the reference trajectory 202 which continues straight. Of course, other orientations can be used as well (e.g., a curve to the left (e.g., the curve 214) can correspond to a positive curvature and a curve to the right (e.g., the curve 216) can correspond to a negative curvature).

The reference trajectory 202 can be divided into discrete segments based at least in part on curvature values of various points in the reference trajectory 202. For example, the reference trajectory 202 can include transition points 204, 206, 208, and 210. In some instances, a segment of the reference trajectory 202 can be defined at least in part by the various transition points 204, 206, 208, and/or 210.

A first segment can be defined by the transition points 204 and 206, and can include a curve 212 (associated with a curvature value). In some instances, the curve 212 can correspond to a straight-line segment (e.g., the curve 212 can be associated with a curvature value of zero).

A second segment can be defined by the transition points 206 and 208, and can include a curve 214. In some instances, the curve 214 can correspond to a negative curvature.

A third segment can be defined by the transition points 208 and 210, and can include a curve 216. In some instances, the curve 216 can correspond to a positive curvature.

As used herein, the all the points of the reference trajectory 202 associated with a particular segment can correspond to a curvature value of the same sign. That is, all of the points in the first segment defined by the transition points 204 and 206 can correspond to a zero curvature value. In some instances, all of the points in the second segment defined by the transition points 206 and 208 can correspond to a negative curvature value. In some instances, all of the points in the second segment defined by the transition points 208 and 210 can correspond to a positive curvature value.

As can be understood, a magnitude of the curvature values within each segment can vary, while in some instances, each of the points in a segment can include curvature values of the same sign.

As can be understood, the curvature of the segments can be continuous between the various segments.

Figure 3:
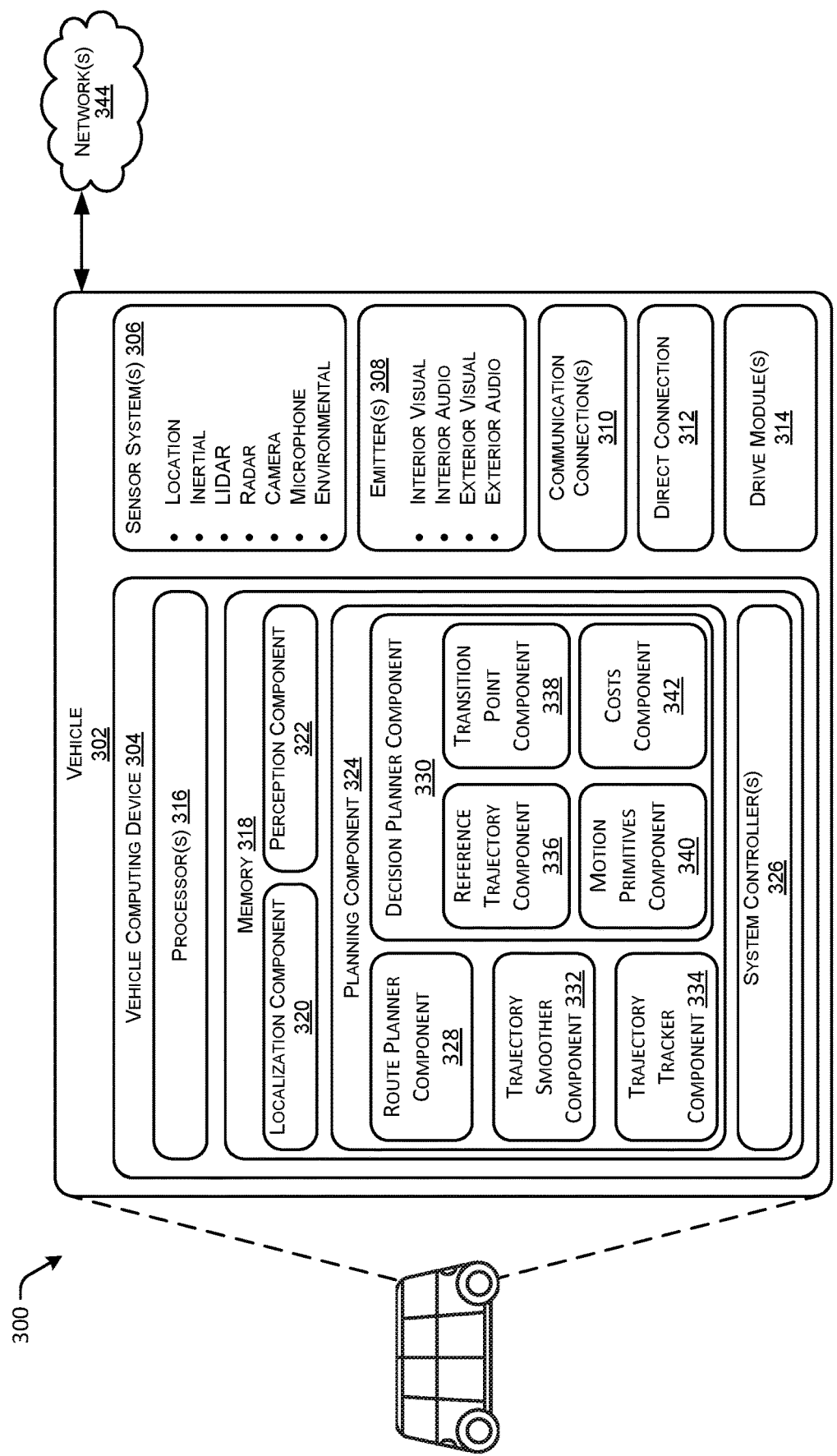
FIG. 3 depicts a block diagram of an example system for implementing the techniques described herein.

FIG. 3 depicts a block diagram of an example system 300 for implementing the techniques described herein. In at least one example, the system 300 can include a vehicle 302, which can be the same vehicle as the vehicle 102 described above with reference to FIG. 1.

The vehicle 302 can include a vehicle computing device 304, one or more sensor systems 306, one or more emitters 308, one or more communication connections 310, at least one direct connection 312, and one or more drive modules 314.

The vehicle computing device 304 can include one or more processors 316 and memory 318 communicatively coupled with the one or more processors 316. In the illustrated example, the vehicle 302 is an autonomous vehicle; however, the vehicle 302 could be any other type of vehicle. In the illustrated example, the memory 318 of the vehicle computing device 304 stores a localization component 320, a perception component 322, a planning component 324, and one or more system controllers 326. Further, the planning component 324 can include a route planner component 328, a decision planner component 330, a trajectory smoother component 332, and a trajectory tracker component 334. The decision planner component 330 can further include a reference trajectory component 336, a transition point component 338, a motion primitives component 340, and a costs component 342. Though depicted in FIG. 3 as residing in memory 318 for illustrative purposes, it is contemplated that the planning component 324 may additionally, or alternatively, be accessible to the vehicle 302 (e.g., stored remotely).

In at least one example, the localization component 320 can include functionality to receive data from the sensor system(s) 306 to determine a position of the vehicle 302. For example, the localization component 320 can include a three-dimensional map of an environment and can continuously determine a location of the autonomous vehicle within the map. In some instances, the localization component 320 can utilize SLAM (simultaneous localization and mapping) or CLAMS (calibration, localization and mapping, simultaneously) to receive image data, LIDAR data, RADAR data, IMU data, GPS data, and the like to accurately determine a location of the autonomous vehicle. In some instances, the localization component 320 can provide data to various components of the vehicle 302 to determine an initial position of an autonomous vehicle for generating a candidate trajectory, as discussed herein.

In some instances, the perception component 322 can include functionality to perform object detection, segmentation, and/or classification. In some examples, the perception component 322 can provide processed sensor data that indicates a presence of an entity that is proximate to the vehicle 302 and/or a classification of the entity as an entity type (e.g., car, pedestrian, cyclist, unknown, etc.). In additional and/or alternative examples, the perception component 322 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, etc. Characteristics associated with the environment can include, but are not limited to, a presence of another entity in the environment, a state of another entity in the environment, a time of day, a day of a week, a season, a weather condition, an indication of darkness/light, etc.

In at least one example, the vehicle computing device 304 can include one or more system controllers 326, which can be configured to control steering, propulsion, braking, safety, emitters, communication, and other systems of the vehicle 302. These system controller(s) 326 can communicate with and/or control corresponding systems of the drive module(s) 314 and/or other components of the vehicle 302.

In general, the planning component 324 can determine a path for the vehicle 302 to follow to traverse through an environment. As discussed above, the planning component 324 can include the route planner component 328, the decision planner component 330, the trajectory smoother component 332, and the trajectory tracker component 334

In some instances, the route planner component 328 can be configured to determine a most efficient route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. In at least one example, the route planner component 328 can perform a search, such as a graph search, on top of a map to identify a route to guide the autonomous vehicle from a first location to a second location. For the purpose of this discussion, a map can be any number of data structures modeled in two dimensions or three dimensions that are capable of providing information about an environment, such as, but not limited to, topologies (such as intersections), streets, mountain ranges, roads, terrain, and the environment in general. In at least one example, the route planner component 328 can utilize a graph traversal algorithm to identify a route to guide an autonomous vehicle from a first location to a second location. Graph traversal algorithms can include algorithms for unweighted graphs (e.g., breadth first search, depth first search, greedy best first, A* search, etc.) and/or weighted graphs (e.g., Dijkstra's algorithm, weighted A* search, etc.).

In some examples, the route planner component 328 can identify two or more candidate routes for guiding the autonomous vehicle from the first location to the second location. In such examples, the route planner component 328 can rank the two or more candidate routes based on route planning constraint(s). Route planning constraint(s) can include rules of the road, travel time, travel distance, etc. In at least one example, the route planner component 328 can determine that a top-ranking candidate route is the route for guiding the autonomous vehicle from the first location to the second location. The route planner component 328 can output a sequence of waypoints corresponding to the route to the decision planner component 330.

In general, and in some instances, the decision planner component 330 can receive the route (e.g., the sequence of waypoints) and can generate an instruction for guiding the autonomous vehicle along at least a portion of the route from the first location to the second location. In at least one example, the decision planner component 330 can determine how to guide the autonomous vehicle from a first waypoint in the sequence of waypoints to a second waypoint in the sequence of waypoints. In some examples, the instruction can be a trajectory, or a portion of a trajectory. In such examples, the decision planner component 330 can generate a sequence of actions (e.g., drive down the road, accelerate, change lanes, turn left, etc.) to guide the autonomous vehicle along the route. In other examples, the instruction can be a policy. A policy can be used to determine a trajectory of the autonomous vehicle based on real-time processed sensor data received from sensor(s) on the autonomous vehicle.

Further, the decision planner component 330 can include the reference trajectory component 336, the transition point component 338, the motion primitives component 340, and the costs component 342.

The reference trajectory component 336 can be configured to generate an "ideal" route based at least in part on the route provided by the route planner component 328. In some instances, the reference trajectory component 328 can generate a plurality of reference trajectories, each reference trajectory corresponding to an individual action. In some instances, a reference trajectory can be based at least in part on a centerline of a road segment (e.g., to orient a vehicle within a center of a lane). In some instances, reference trajectories can be determined by the reference trajectory component 336 and/or can be received from an external computing device (e.g., from a teleoperations center) via the network(s) 344.

In some examples, the transition point component 338 can include functionality to determine transition points associated with a reference trajectory. In some examples, the transition point component 338 can parse portions of a reference trajectory to determine curvature values and signs (e.g., positive, zero, negative) of the curvature values. Based at least in part on the curvature values, the transition point component 338 can divide a reference trajectory into discrete segments. In some instances, the discrete segments can be provided to the various components of the decision planner component 330, for example, for determining an arc length of the segment and/or a distance traveled of the vehicle 302 following a trajectory based on the segment(s).

In some examples, the motion primitives component 340 can include motion primitives associated with motion of the vehicle 302. In some instances, the motion primitives can be approximate in that particular quantities, such as path length, acceleration, and lateral offset, can be known with some degree of certainty, while other values that depend on a curvature of a reference trajectory, such as an arc length of the reference trajectory, can be bounded by an upper bound and a lower bound. In some instances, characteristics such as energy expenditure and path length can be stored along with the various motion primitives.

In some instances, a state of the vehicle 302 can be expressed with respect to a route-relative coordinate system, such as the environment 100 described with respect to FIG. 1.

In some instances, a state of the vehicle can be expressed as:

$$X = (s, e_r, e_\theta, v) \in \mathbb{R}^4 \qquad (1)$$

where s is an arc length (e.g., the reference trajectory arc length 116) along the reference trajectory (e.g., the reference trajectory 104), $e_r$ is a lateral offset (e.g., the lateral offset 108) relative to the reference trajectory 104, $e_\theta$ is an angular offset (e.g., 110) from a vector that is tangent to a reference point (e.g., the reference point 106), and v is a forward-body velocity of the vehicle (e.g., 102 or 302).

In some instances, the controls associated with the vehicle 302 include an acceleration:

$$a \in \mathbb{R} \qquad (2)$$

and a steering angle:

$$\delta \in \mathbb{R} \qquad (3)$$

Further, in some instances, dynamics of the vehicle 302 can be represented by bicycle dynamics (e.g., the vehicle 302 can be represented as a "bicycle" with two wheels and a length L (e.g., the length 118), whereby bicycle dynamics can be represented as:

$$\dot{s} = \frac{v\cos e_\theta}{1 - k(s)e_r} \qquad (4)$$

$$\dot{e}_r = v\sin e_\theta \qquad (5)$$

$$\dot{e}_\theta = v\left(\frac{\tan\delta}{L} - k(s)\dot{s}\right) = v\left(\frac{\tan\delta}{L} - \frac{k(s)\cos e_\theta}{1 - k(s)e_r}\right) \qquad (6)$$

$$\dot{v} = a \qquad (7)$$

where k(s) can represent a curvature of the reference trajectory at a point s, and L can represent a length of the vehicle 302.

In some instances, a trajectory can be represented as piecewise geometry segments having a curvature that is linear in s, which is to say that each segment can be a clothoid curve. In some instances, a curvature of an i-th segment along the reference trajectory can be parameterized as:

$$k_i(s) = k_{i0} + k_{i1}s \qquad (8)$$

with:

$$k_{i0}, k_{i1} \in \mathbb{R} \qquad (9)$$

and where an end point of a segment can be defined as $s_{ki}$. Further, N segments can be appended piecewise to form a full reference curve according to:

$$k(s) = \begin{cases} k_0(s), & 0 \leq s < s_{k0} \\ k_1(s), & s_{k0} \leq s < s_{k1} \\ \vdots & \vdots \\ k_N(s), & s_{k(N-1)} \leq s \leq s_N \end{cases} \qquad (10)$$

such that k(s) is continuous.

In some instances, approximate motion primitives are discussed herein. In some instances, the motion primitives can be time-invariant such that a primitive over a time interval can be defined as $t \in [0, t_f]$, whereby $t_f$ can be a selectable time value. In some instances, $t_f$ can be selected by a user.

In some instances, an acceleration of the vehicle 302 can be parameterized as a constant value across time, such that:

$$a(t) = a \qquad (11)$$

In some instances, a lateral offset can be parameterized as a cubic function in time, such that:

$$e_r(t) = e_{r0} + e_{r1}t + e_{r2}t^2 + e_{r3}t^3 \qquad (12)$$

Further, constants $\{e_{r0}, e_{r1}, e_{r2}, e_{r3}\}$ can be selected to satisfy the boundary conditions of $e_{r0}(o), \dot{e}_{r0}(o), e_r(t_f), \dot{e}_r(t_f)$ resulting in continuity in $e_r$ and $e_\theta$. In some instances, $t_f$ can be selected, such that v(t) can be known.

Given a(t) and $e_r(t)$, the angular offset trajectory $e_\theta(t)$ can be recovered. Equation (5) discussed above can be solved for $e_\theta$, which can be represented as:

$$e_\theta(t) = \arcsin\left(\frac{\dot{e}_r(t)}{v(t)}\right) \qquad (13)$$

Further, the time derivative of equation (10) can be give as:

$$\dot{e}_\theta(t) = \frac{v(t)\ddot{e}_r(t) - \dot{e}_r(t)a}{v\sqrt{v(t)^2 - \dot{e}_r(t)^2}} \qquad (14)$$

which, in turn, can be used to recover δ(t) by substituting (12) into (6) such that:

$$\frac{\tan\delta}{L} = \frac{v(t)\ddot{e}_r(t) - \dot{e}_r(t)a}{v\sqrt{v(t)^2 - \dot{e}_r(t)^2}} + \frac{k(s)\cos e_\theta(t)}{1 - k(s)e_r(t)} \qquad (15)$$

Using equation (11) for $e_\theta$ in equation (4), vehicle dynamics can be represented as:

$$\dot{s} = \frac{\sqrt{v(t)^2 - \dot{e}_r(t)^2}}{1 - k(s)e_r(t)} \qquad (16)$$

In some instances, assuming a constant lateral offset (e.g., $e_r(t) = e_{r0}$), and by noting that $e_\theta(t) = 0$ or π (e.g., the heading of the vehicle is along, or anti-parallel to the reference trajectory), s(t) can be solved analytically.

The approximate motion primitives may correspond to a total distance traveled (e.g., the distance traveled 114), $q(t) \triangleq \int_0^t v(t')dt'$. In some examples, the primitives may be based on a hypothetical segment having a constant lateral offset (e.g., 108), such that $e_r(t) = e_{r0}$. In such examples, the reference trajectory (e.g., 104) may correspond to a single geometry segment, such that $k(s) = k_0 + k_1 s$. Further, the assumption can be made that $e_{r0} < k(s)$, $v(t) \geq 0$, and $e_\theta(t) = 0$ (as opposed to π) along the interval considered. Thus, an arc length trajectory s(t) is related to q(t) by the following:

$$s(t) = \begin{cases} \dfrac{(1 - e_{r0}k_0) - \sqrt{(1 - e_{r0}k_0)^2 - 2e_{r0}k_1 q(t)}}{e_{r0}k_1}, & e_{r0}k_1 \neq 0 \\ \dfrac{q(t)}{1 - e_{r0}k_1}, & e_{r0}k_1 = 0 \end{cases} \quad (17)$$

In some instances, the total distance traveled q(t) can be precomputed based at least in part on the acceleration primitive, such that solving s(t) has the complexity of taking a square root.

In some instances, bounds can be provided for s(t) for those cases where $e_r(t)$ is not constant. Such bounds (upper and lower) are defined below.

Upper and lower boundaries for can be defined where the reference trajectory includes a single geometry segment and has a constant sign (e.g., either positive or negative) over the interval considered.

Let $e_{r_{min}} \leq e_r(t) \leq e_{r_{max}}$, which is to say that the lateral offset varies between some minimum ($e_{r_{min}}$) and some maximum ($e_{r_{max}}$), along the segment. Assume that k(s), the curvature as a function of arc length, includes a single geometry segment that has a constant sign over the interval considered, and that $e_{r_{min}} k(s) < 1$, $e_{r_{max}} k(s) < 1$. A definition can include:

$$q_{\parallel}^l(t) \triangleq q(t) - \int_0^t |\dot{e}_r(t')| dt' \quad (18)$$

$$s_c(e_r, q, k) \triangleq \dfrac{(1 - e_r k_0) - \sqrt{(1 - e_r k_0)^2 - 2e_r k_1 q}}{e_r k_1} \quad (19)$$

and accordingly, s(t) can be lower bounded as:

$$s(t) \geq s_{lb}(t) \triangleq \begin{cases} s_c(e_{r_{min}}, q_{\parallel}^l(t), k), & e_{r_{min}} k_1 \neq 0, k(s) > 0 \\ \dfrac{q_{\parallel}^l(t)}{1 - e_{r_{min}} k_0}, & e_{r_{min}} k_1 = 0, k(s) > 0 \\ s_c(e_{r_{max}}, q_{\parallel}^l(t), k), & e_{r_{max}} k_1 \neq 0, k(s) \leq 0 \\ \dfrac{q_{\parallel}^l(t)}{1 - e_{r_{max}} k_0}, & e_{r_{max}} k_1 = 0, k(s) \leq 0 \end{cases} \quad (20)$$

Similarly, s(t) can be upper bounded as:

$$s(t) \leq s_{ub}(t) \triangleq \begin{cases} s_c(e_{r_{max}}, q(t), k), & e_{r_{max}} k_1 \neq 0, k(s) > 0 \\ \dfrac{q(t)}{1 - e_{r_{max}} k_0}, & e_{r_{max}} k_1 = 0, k(s) > 0 \\ s_c(e_{r_{min}}, q(t), k), & e_{r_{min}} k_1 \neq 0, k(s) \leq 0 \\ \dfrac{q(t)}{1 - e_{r_{min}} k_0}, & e_{r_{min}} k_1 = 0, k(s) \leq 0 \end{cases} \quad (21)$$

Because acceleration is constant, there may be scenarios in which velocity is negative (e.g. a constant negative acceleration). In such examples, i.e. where v(t)≤0, the problem can be considered the same as above but with reversing the sign of $k_1$ and applying the same bounds as described in detail above. Conceptually, this equates to reversing the trajectory and maintaining a positive velocity. In some instances, a subsegment of a segment can be based on all points with the subsegment associated with a velocity having a same sign (e.g., positive velocity or negative velocity).

Example Algorithms:

In some instances, the upper and lower bounds can be utilized for computing bounds on the change in arc length of a motion primitive that traverses a piecewise geometry whose curvature possibly changes sign. In some instances, transition points along the reference trajectory can be identified, as discussed herein. That is, an ordered list ($s_0$, $s_1$, $s_2$, ..., $s_n$) can be determined (where n is an integer), where $s_i$ can correspond to a point along the candidate trajectory (or piece of the candidate trajectory) where the curvature changes sign or where a new geometry segment begins. In some instances, a segment can be bounded by two transition points, and further, the curvature of the segment is linear in s and has a constant sign, such that the curvature function between $s_{i-1}$ and $s_i$ can be designated as $k_i(s)$. Thus, the bounds discussed above can be applied to each segment individually to determine bounds for the whole reference trajectory. Of course, curvatures of each segment of the reference trajectory may be selected to preserve piece-wise continuity. In some instances, a path length traveled by the vehicle 302 for a constant lateral offset $e_r$ and a distance s along the reference trajectory can be represented as:

$$q_c(s, e_r, k) = s - e_r(k_0 s + \tfrac{1}{2} k_1 s^2) \quad (22)$$

As discussed above, the functions discussed assume a positive velocity trajectory. In some instances, because the motion primitives can be parameterized by a constant acceleration, the velocity of the trajectory can switch sign once at most per segment. To extend the algorithms to the full case (positive and negative velocities), the trajectory can be split into two segments, one with a positive velocity and one with a negative velocity. In some cases, a time horizon for each segment can be determined based at least in part on v(0) and the acceleration (a). The change in arc length can be bounded separately using Algorithms 1 and 2 (discussed below) and combined together to get a bound over the full time horizon.

In some instances, the bounds can be used to approximate the arc length s(t) of a primitive. One example can be represented by the heuristic function:

$$s_h(t_f) \triangleq \dfrac{s_{lb}(t_f) + s_{ub}(t_f)}{2} \quad (23)$$

That is, in some instances, an approximate arc length can be determined as an average of the lower bound of the arc length and the upper bound of the arc length, as discussed herein. As the arc-length, acceleration, and other parameters are determined in accordance with the examples provided herein, such an approximate motion primitive may then be used to control an autonomous vehicle.

A first algorithm (Algorithm 1) is given below in Table 1 for determining a lower bound of s(t) for a reference trajectory with piecewise linear curvature

TABLE 1

Algorithm 1, lower bound s(t) for a reference
line with a piecewise linear curvature.

Given q(t), $e_r$(t), $t_f$, $s_{start}$
Compute $e_{r\_max}$, $e_{r\_min}$ along interval [0, $t_f$]
Compute transition points $s_{trans}$ ← ($s_0, s_1, \ldots, s_n$)
$q_r$ ← q($t_f$) − $\int_0^{t_f} |\dot{e}_r(t')| dt'$ // Remaining path length
i ← 0
$s_{lb\_total}$ ← 0
while $q_r$ > 0 do TABLE 1-continued Algorithm 1, lower bound s(t) for a reference line with a piecewise linear curvature.

```
    if sign(k_i) > 0 then
        e_{r_lb} ← e_{r_min}
    else
        e_{r_lb} ← e_{r_max}
    end if
    if e_{r_lb}k_i ≠ 0 then
        s_{lb_segment} ← s_c(q_r, e_{r_lb}, k_i)
    else
```

$$s_{lb\_segment} \leftarrow \frac{q_r}{1 - e_{r\_lb}k_i}$$

```
    end if
    if s_start + s_{lb_segment} ≥ s_trans[i] then
        s_{lb_total} ← s_{lb_total} + s_trans[i] − s_start
        q_r ← q_r − q_c(s_trans[i] − s_start, e_{r_lb}, k_i)
        s_start ← s_trans[i]
        i ← i + 1
    else
        s_{lb_total} ← s_{lb_total} + s_{lb_segment}
        q_r ← 0
    end if
end while
return s_{lb_total}
```

A second algorithm (Algorithm 2) is given below in Table 2 for determining an upper bound of s(t) for a reference trajectory with piecewise linear curvature

TABLE 2

Algorithm 2, upper bound s(t) for a reference line with a piecewise linear curvature.

```
Given q(t), e_r(t), t_f, s_start
Compute e_{r_max}, e_{r_min} along interval [0, t_f]
Compute transition points s_trans ← (s_0, s_1, ..., s_n)
q_r ← q(t_f)  // Remaining path length
i ← 0
s_{ub_total} ← 0
while q_r > 0 do
    if sign(k_i) > 0 then
        e_{r_ub} ← e_{r_max}
    else
        e_{r_ub} ← e_{r_min}
    end if
    if e_{r_ub}k_i ≠ 0 then
        s_{ub_segment} ← s_c(q_r, e_{r_ub}, k_i)
    else
```

$$s_{ub\_segment} \leftarrow \frac{q_r}{1 - e_{r\_ub}k_{io}}$$

```
    end if
    if s_start + s_{ub_segment} ≥ s_trans[i] then
        s_{ub_total} ← s_{ub_total} + s_trans[i] − s_start
        q_r ← q_r − q_c(s_trans[i] − s_start, e_{r_ub}, k_i)
        s_start ← s_trans[i]
        i ← i + 1
    else
        s_{ub_total} ← s_{ub_total} + s_{ub_segment}
        q_r ← 0
    end if
end while
return s_{ub_total}
```

In some examples, the costs component 342 can be configured to determine costs and/or constraints associated with the trajectories. In some instances, examples of a constraint can include, but are not limited to, obstacles, boundaries of a road, other vehicles or pedestrians, and the like. In some instances, constraints may be defined based on the geometry of the segment. For example, it may not be physically possible for one segment to have a large positive curvature curve and the next segment to have a large negative curvature. As such, one constraint may be to enforce continuity between segments. Further constraints include considering the steering angle of one segment and the curvature of the next. In some instances, examples of costs can include, but are not limited to, a distance between the vehicle and a reference trajectory (e.g., lateral offset), penalties for violating rules of the road, arc length, distance traveled, a distance between the vehicle and an obstacle, acceleration/deceleration, steering rate, velocity, comfort, performance, safety, and the like. In some examples, the costs component 342 can include one or more threshold values for determining whether a segment is optimized. In some instances, the costs component can determine costs associated with a plurality of segments and/or a plurality of trajectories to determine an optimal segment and/or trajectory to implement in the vehicle 302.

In some examples, the trajectory smoother component 332 can include functionality to receive an instruction (e.g., from the decision planner component 330) and optimize the instruction based on objects identified in the environment. In at least one example, the trajectory smoother component 332 can access, receive, and/or determine real-time processed sensor data to determine object(s) in the environment which the autonomous vehicle is travelling. In the at least one example, the trajectory smoother component 332 can process the instruction in view of the real-time processed sensor data.

In an example where the instruction is a trajectory, the trajectory smoother component 332 can leverage model(s) and/or algorithm(s), constraint(s), and/or cost(s) to optimize the trajectory. For instance, the trajectory smoother component 332 can utilize model(s) and/or algorithm(s) including, but not limited to, differential dynamic programming, interior point optimization, sequential quadratic programming, etc. to refine the trajectory. In at least one example, the constraint(s) can include, but are not limited to, geometry and/or physical properties of the vehicle and/or environment, etc. In at least one example, the cost(s) can include, but are not limited to, performance (e.g., speed), minimizing lateral acceleration, positioning in a lane, etc. In at least one example, the model(s) and/or algorithm(s) can include bi-directionality. In such an example, a velocity of the autonomous vehicle can be optimized to include a positive, a negative, or a zero value. In at least one example, a rotation of the autonomous vehicle can be described using Euclidian matrices. As a result, a same model and/or algorithm can be used for optimizing a trajectory having different types of waypoints (e.g., road, intersection, roundabout, etc.). Based at least in part on processing the trajectory, in view of the real-time processed sensor data, the trajectory smoother component 332 can generate an output trajectory.

In an example where the instruction is a policy, the trajectory smoother component 332 can leverage model(s) and/or algorithm(s), constraint(s), and/or cost(s) to generate a trajectory based on the policy and real-time processed sensor data. For instance, the trajectory smoother component 332 can utilize model(s) and/or algorithm(s) including, but not limited to, differential dynamic programming, interior point optimization, sequential quadratic programming, etc. to generate a trajectory based on the policy. For the purpose of this discussion, the trajectory can be called an output trajectory.

As described above, the trajectory smoother component 332 can access, receive, and/or determine real-time processed sensor data. The trajectory smoother component 332 can leverage the real-time processed sensor data to generate an output trajectory. The trajectory smoother component 332 can utilize a more detailed model of the autonomous vehicle than the decision planner component 330. Processing that utilizes such a detailed model can be computationally expensive. Additionally, the trajectory smoother component 332 can output an output trajectory within a predetermined amount of time after receiving the real-time processed sensor data. For instance, in at least one example, the trajectory smoother component 332 can receive an interrupt requesting an output trajectory and the trajectory smoother component 332 can provide an output trajectory responsive to receiving the interrupt.

In some examples, the trajectory tracker component 334 can include functionality to receive an output trajectory from the trajectory smoother component 332 and can compute commands for actuating steering and acceleration of the autonomous vehicle to enable the autonomous vehicle to follow the output trajectory. In at least one example, the trajectory tracker component 334 can receive the output trajectory and can compute a steering angle and velocity to enable the autonomous vehicle to follow the output trajectory. In some examples, the trajectory tracker component 334 can include a separate vehicle controller configured to control steering, propulsion, braking, safety, emitters, communication, and other systems of the vehicle.

In some instances, aspects of some or all of the components discussed herein may include any models, algorithms, and/or machine learning algorithms. For example, in some instances, the components in the memory 318 may be implemented as a neural network.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, and the like.

In at least one example, the sensor system(s) 306 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 306 can include multiple instances of each of these or other types of sensors. For instance, the LIDAR sensors can include individual LIDAR sensors located at the corners, front, back, sides, and/or top of the vehicle 302. As another example, the camera sensors can include multiple cameras disposed at various locations about the exterior and/or interior of the vehicle 302. The sensor system(s) 306 can provide input to the vehicle computing device 304. Additionally and/or alternatively, the sensor system(s) 306 can send sensor data, via the one or more networks 344, to the one or more server computing device(s) at a particular frequency, after a lapse of a predetermined period of time, in near real-time, etc.

The vehicle 302 can also include one or more emitters 308 for emitting light and/or sound, as described above. The emitters 308 in this example include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 308 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles.

The vehicle 302 can also include one or more communication connection(s) 310 that enable communication between the vehicle 302 and one or more other local or remote computing device(s). For instance, the communication connection(s) 310 can facilitate communication with other local computing device(s) on the vehicle 302 and/or the drive module(s) 314. Also, the communication connection(s) 310 can allow the vehicle to communicate with other nearby computing device(s) (e.g., other nearby vehicles, traffic signals, etc.). The communications connection(s) 310 also enable the vehicle 302 to communicate with a remote teleoperations computing device or other remote services.

The communications connection(s) 310 can include physical and/or logical interfaces for connecting the vehicle computing device 304 to another computing device or a network, such as network(s) 344. For example, the communications connection(s) 310 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 302 can include one or more drive modules 314. In some examples, the vehicle 302 can have a single drive module 314. In at least one example, if the vehicle 302 has multiple drive modules 314, individual drive modules 314 can be positioned on opposite ends of the vehicle 302 (e.g., the front and the rear, etc.). In at least one example, the drive module(s) 314 can include one or more sensor systems to detect conditions of the drive module(s) 314 and/or the surroundings of the vehicle 302. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders can be unique to the drive module(s) 314. In some cases, the sensor system(s) on the drive module(s) 314 can overlap or supplement corresponding systems of the vehicle 302 (e.g., sensor system(s) 306).

The drive module(s) 314 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 314 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 314. Furthermore, the drive module(s) 314 also include one or more communication connection(s) that enable communication by the respective drive module with one or more other local or remote computing device(s).

The processor(s) 316 of the vehicle 302 can be any suitable processor capable of executing instructions to process data and perform operations as described herein. By way of example and not limitation, the processor(s) 316 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 318 is an example of non-transitory computer-readable media. The memory 318 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 3 is illustrated as a distributed system, in alternative examples, components of the vehicle 302 can be associated with remote computing devices accessible via the network(s) 344.

Figure 4:
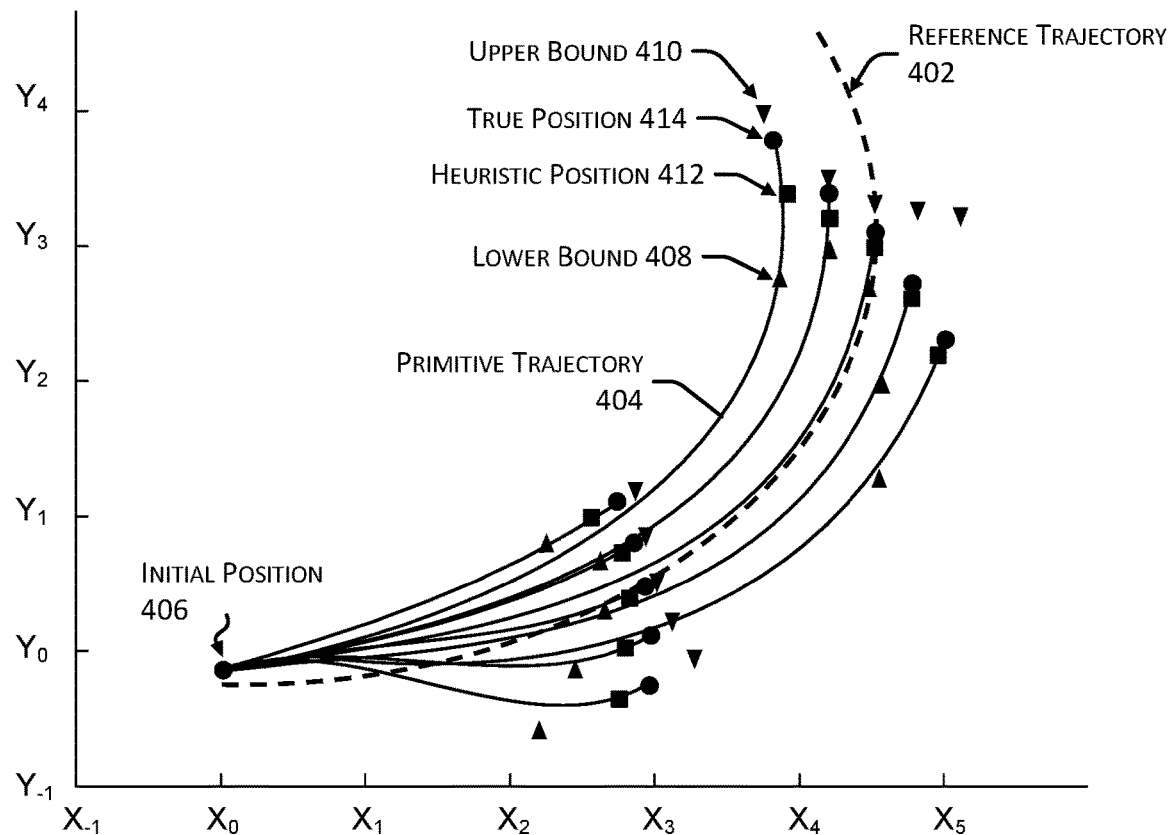
FIG. 4 depicts a graphic representation of various motion primitives, as discussed herein.

FIG. 4 depicts a graphic representation 400 of various motion primitives, as discussed herein. For example, the graphic representation 400 includes a reference trajectory 402 and a plurality of primitive trajectories generated using the techniques discussed herein. As illustrated, a primitive trajectory 404 is illustrated as originating from an initial position 406 in a direction corresponding to the reference trajectory 402.

In some instances, individual ones of the motion primitive trajectories can represent trajectories having different costs, curvature values, and the like.

In some instances, the primitive trajectory 404 can be associated with a lower bound 408 and an upper bound 410 of an arc length corresponding to the reference trajectory. In some instances, the lower bound 408 and/or the upper bound 410 can be determined using the motion primitives discussed herein. In some instances, a heuristic position 412 can be determined (e.g., an average of the upper bound 408 and the lower bound 408). Further, the arc length can be associated with a true position 414 (e.g., determined via Euler integration). Thus, the graphic representation 400 illustrates the accuracy of the motion primitives and heuristics, as discussed herein. In some instances, an average error between the heuristic position 412 and the true position 414 does not exceed 4% (four percent), while determining the heuristic position 412 can be orders of magnitude faster than determining the true position 414 (e.g., 1000 times faster).

Figure 5:
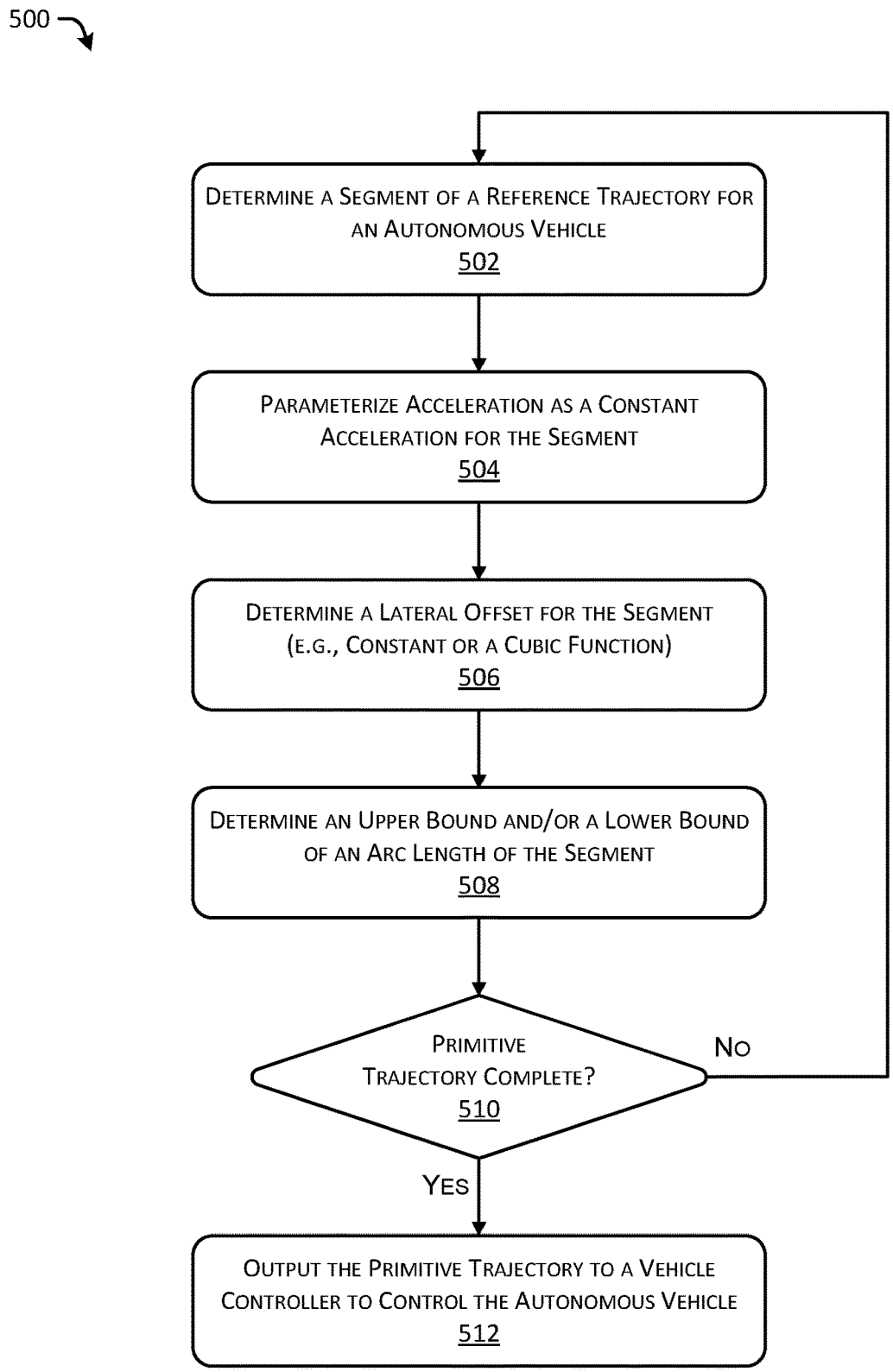
FIG. 5 depicts an example process for determining a trajectory based on motion primitives associated with acceleration and lateral offset of a vehicle, as discussed herein.
Figure 6:
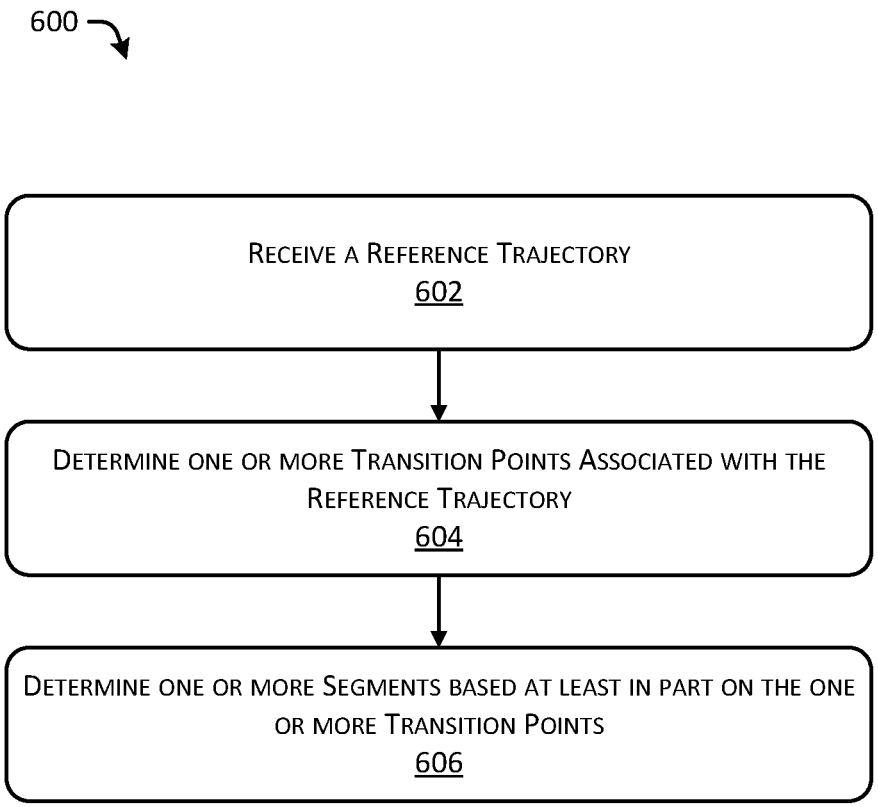
FIG. 6 depicts an example process for determining segments of a reference trajectory based on transition points, as discussed herein.
Figure 7:
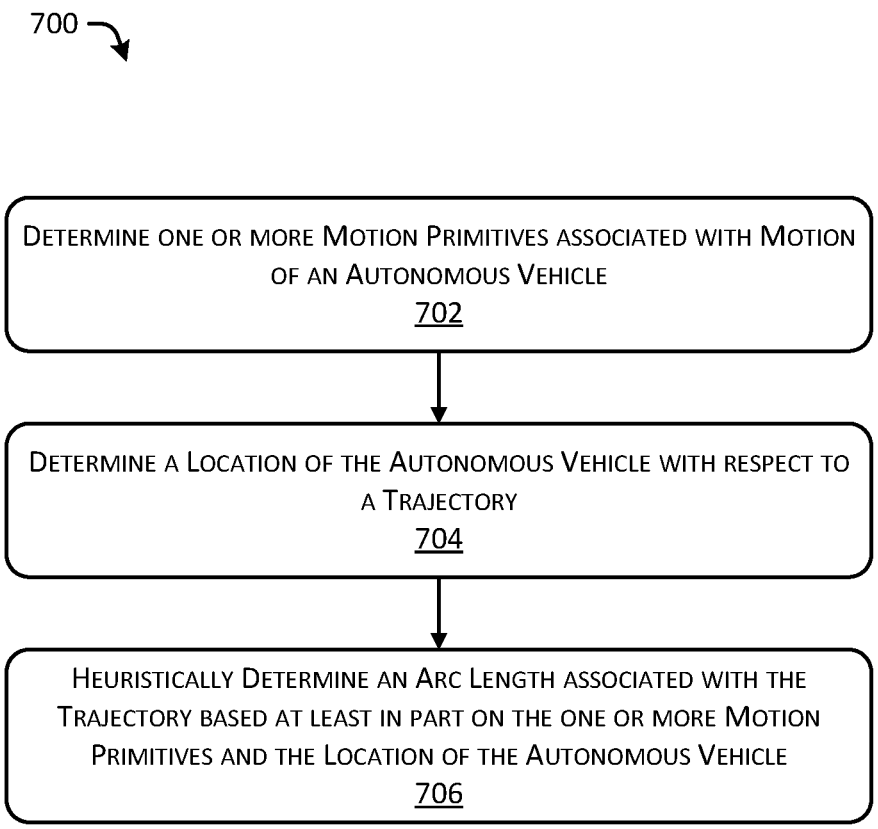
FIG. 7 depicts an example process for heuristically determining a distance traveled based on an arc length of a reference trajectory, as discussed herein.

FIGS. 5-7 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 depicts an example process 500 for determining a trajectory based on motion primitives associated with acceleration and lateral offset of a vehicle, as discussed herein. For example, some or all of the process 500 can be performed by one or more components in FIG. 3, as described herein. For example, some or all of the process 500 can be performed by the planning component 324.

At operation 502, the process can include determining a segment of a reference trajectory for an autonomous vehicle. In some instances, the reference trajectory can correspond to a centerline of a road segment, for example, or any drivable surface. In some instances, the reference trajectory can be generated by the route planner component 328 and provided to the decision planner component 330 or can be generated by the decision planner component 330 based at least in part on waypoints (or other information) provided by the route planner component 328. In some instances, the operation 502 can include parsing the reference trajectory to determine portions of the reference trajectory whereby by a curvature of the trajectory portion (e.g., a segment) has a same sign for all points in the segment. For example, in some instances, a first segment can have positive curvature values across all points of the first segment, and in some instances, a second segment can have negative curvature values across all points of the second segment. Similarly, a third segment may have zero curvature. In some instances, the process 500 can be performed piecewise for all segments of a reference trajectory.

At operation 504, the process can include parameterizing acceleration as a constant acceleration for the segment. That is, in some instances, the acceleration a(t)=a, for all points in the segment.

At operation 506, the process can include determining a lateral offset of the autonomous vehicle relative to the reference trajectory. In some instances, the operation can include determining an average lateral offset of the autonomous vehicle over time. In some instances, if a rate of change of a lateral offset is below a threshold value, the lateral offset can be considered to be a constant lateral offset. In some instances, the lateral offset can be set as a cubic function, such as:

$$e_r(t)=e_{r0}+e_{r1}t+e_{r2}t^2+e_{r3}t^3 \quad (24)$$

Further, constants $\{e_{r0}, e_{r1}, e_{r2}, e_{r3}\}$ can be selected to satisfy the boundary conditions of $e_{r0}(o)$, $\dot{e}_{r0}(o)$, $e_r(t_f)$, $\dot{e}_r(t_f)$ resulting in continuity in $e_r$ and $e_\theta$.

At operation 508, the process can include determining an upper bound and/or a lower bound of an arc length of the segment. In some instances, the Algorithms 1 and/or 2, discussed above, can be used to determine the upper and/or lower bounds of the arc length of the segment. In some instances, the operation 508 can include determining an average arc length based at least in part on an average between the upper bound and the lower bound of the arc length, as discussed herein.

At operation 510, the operation can include determining whether a primitive trajectory is complete. For example, the process 500 can be performed piecewise all segments of a reference trajectory. Thus, the operation 510 can include determining whether all segments of the reference trajectory have been processed (e.g., whether an arc length has been determined for each segment of the reference trajectory). If the primitive trajectory is not complete (e.g., "no" in the operation 510), the process can continue to the operation 502, whereby the primitive trajectory can be iteratively generated, as discussed herein. If the primitive trajectory is complete (e.g., "yes" in the operation 510), the process 500 can continue to operation 512.

At operation 512, the process can include outputting the segment to a vehicle controller to control the autonomous vehicle. For example, the autonomous vehicle can be commanded to follow the segment to traverse through an environment. In some instances, the operation 512 can include determining one or more costs associated with the primitive trajectory based at least in part on the arc length(s) determined herein. In some instances, the operation 512 can include determining one or more costs for a plurality of segments of the reference trajectory and/or the primitive trajectory and summing the costs to determine an aggregated cost. In some instances, the operation 512 can include comparing the one or more costs to a threshold value to determine if the segments are sufficiently optimized to be used to navigate the autonomous vehicle.

FIG. 6 depicts an example process for determining segments of a reference trajectory based on transition points, as discussed herein. For example, some or all of the process 600 can be performed by one or more components in FIG. 3, as described herein. For example, some or all of the process 600 can be performed by the planning component 324.

At operation 602, the process can include receiving a reference trajectory. In some instances, the reference trajectory can correspond to a centerline of a road segment, for example, or any drivable surface. In some instances, the reference trajectory can be generated by the route planner component 328 and provided to the decision planner component 330 or can be generated by the decision planner component 330 based at least in part on waypoints (or other information) provided by the route planner component 328.

At operation 604, the process can include determining one or more transition points associated with the reference trajectory. For example, the operation 604 can include determining a curvature value associated with each point of the reference trajectory. The operation 604 can include grouping points of the reference trajectory together based on a similarity of sign (e.g., positive or negative) associated with the reference trajectory. In some instances, a transition point of the one or more transition points can be associated with a point on the reference trajectory were the sign of the curvature changes from a positive value to a negative value, or vice versa. In some instances, a positive value can correspond to a "right turn", while in some cases a positive value can correspond to a "left turn" of reference trajectory, although any frame of reference can be used.

At operation 606, the process can include determining one or more segments based at least in part on the one or more transition points. In some instances, the operation 606 can include associating a segment identifier with various points of the reference trajectory. In some instances, the operation 606 can include verifying that the curvature is continuous between the segments and/or that a curvature of the segments does not have a curvature value that is higher than a maximum curvature value based on velocity, a coefficient of friction of a road surface, and/or other geometric constraints (e.g., it may be impossible to connect two segments having a difference in curvature larger than some threshold). In some instance, the operation 606 can include inputting the segments to one or more algorithms discussed herein to determine an arc length (or bounds associated with the arc length).

FIG. 7 depicts an example process for heuristically determining a distance traveled based on an arc length of a reference trajectory, as discussed herein. For example, some or all of the process 700 can be performed by one or more components in FIG. 3, as described herein. For example, some or all of the process 700 can be performed by the planning component 324.

At operation 702, the process can include determining one or more motion primitives associated with motion of an autonomous vehicle. In some instances, the one or more motion primitives can be precomputed to make trajectory generation and/or planning operations easier and/or faster for deployment on the autonomous vehicle. In some instances, the motion primitives can be based at least in part on acceleration, lateral offset, curvature of a reference trajectory, and the like, and as discussed herein.

At operation 704, the process can include determining a location of the autonomous vehicle with respect to a reference trajectory. For example, the operation can include determining a location of the autonomous vehicle on a map based at least in part on information received from the localization component 320 and/or the perception component 322, as discussed herein. In some instances, the operation 704 can include determining a lateral offset of the autonomous vehicle with respect to the reference trajectory, as discussed in connection with FIG. 1, and throughout this disclosure.

At operation 706, the process can include heuristically determining an arc length associated with a trajectory based at least in part on the one or more motion primitives and the location of the autonomous vehicle. For example, as discussed herein, the operation 706 can include determining an upper bound for arc length, a lower bound for the arc length, and/or an average arc length based at least in part on the upper bound and the lower bound. In some instances, the operation 706 can include utilizing the algorithms discussed herein to heuristically determine the arc length associated with the trajectory. In some instances, the operation 706 can include determining the arc length piecewise for various segments in the trajectory and summing the arc lengths to determining an aggregated arc length. In some instances, the trajectory can include, but is not limited to, a reference trajectory, a primitive trajectory, a candidate trajectory, and the like.

The systems, modules, components, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The systems and methods described herein may be directed to such computer program products.

References to "one embodiment," "an embodiment," "example embodiment," "various embodiments," etc., may indicate that the embodiment(s) of the present disclosure may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may. Similarly, references to "instances" may indicate that various instance(s) of the present disclosure may include a particular feature, structure, or characteristic, but not every instance necessarily includes the particular feature, structure, or characteristic. Further, repeated use of the phrase "in some instances" does not necessarily refer to the same instance, although it may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some implementations the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

Example Clauses

A. A system comprising: one or more processors; and one or more computer-readable media storing instructions executable by the one or more processors, wherein the instructions program the one or more processors to: determine a reference trajectory for an autonomous vehicle to follow in an environment, the reference trajectory based at least in part on a centerline associated with a portion of a road in the environment; determine one or more segments of the reference trajectory, a segment of the one or more segments having a plurality of points, wherein each point of the plurality of points is associated with a same sign of a curvature value, and wherein the curvature value of the segment varies linearly with respect to an arc length along the reference trajectory; determine an acceleration value of the autonomous vehicle, wherein the each point of the plurality of points is associated with the acceleration value; determine a lateral offset of the autonomous vehicle relative to the reference trajectory; determine, based at least in part on the lateral offset, an upper bound for an arc length associated with the segment; determine, based at least in part on the lateral offset, a lower bound for the arc length associated with the segment; define an approximate motion primitive associated with the segment; and control the autonomous vehicle based, at least in part, on the approximate motion primitive.

B: The system of paragraph A, wherein the segment is a first segment associated with a first curvature value, wherein the plurality of points is a first plurality of points, wherein the approximate motion primitive is a first approximate motion primitive, and wherein the instructions, when executed by the one or more processors, further program the one or more processors to: determine a second segment of the reference trajectory, the second segment having a second plurality of points, wherein each point of the second plurality of points is associated with a second curvature value that is opposite the first curvature value; define a second approximate motion primitive associated with the second segment; and control the autonomous vehicle based, at least in part, on the second approximate motion primitive.

C: The system of paragraph A or B, wherein the instructions, when executed by the one or more processors, further program the one or more processors to: determine that the lateral offset associated with the segment is based at least in part on a cubic function in time.

D: The system of any of paragraphs A-C, wherein the instructions, when executed by the one or more processors, further program the one or more processors to: determine a heuristic arc length of the segment of the reference trajectory based at least in part on the lower bound for the arc length, the upper bound for the arc length, and the lateral offset.

E: The system of any of paragraphs A-D, wherein the instructions, when executed by the one or more processors, further program the one or more processors to: determine lower bound values and upper bound values associated with each segment of the one or more segments; and determine an upper bound arc length of the reference trajectory based at least in part on the lower bound values and the upper bound values associated with each segment.

F: The system of any of paragraphs A-E, wherein the approximate motion primitive is associated with one or more of an acceleration, lateral offset, or a velocity.

G: The system of any of paragraphs A-F, wherein at least one of the lower bound or the upper bound of the arc length associated with the segment is based, at least in part, on a minimum lateral offset and a maximum lateral offset, the lateral offset being defined as a cubic polynomial in time.

H: The system of any of paragraphs A-G, wherein the instructions, when executed by the one or more processors, further program the one or more processors to: determine a transition point of the reference trajectory where a sign of trajectory curvature changes from a positive curvature value to a negative curvature value; and determine the segment based at least in part on the transition point of the reference trajectory.

I: A method comprising: determining a reference trajectory for an autonomous vehicle to follow in an environment; determining a segment of the reference trajectory, the segment having a plurality of points, wherein each point of the plurality of points is associated with a same sign of a curvature value; determining an acceleration value of the autonomous vehicle; determining a lateral offset of the autonomous vehicle relative to the reference trajectory; determining, based at least in part on the lateral offset, an upper bound for an arc length associated with the segment;

determining, based at least in part on the lateral offset, a lower bound for the arc length associated with the segment; defining an approximate motion primitive associated with the segment; and controlling the autonomous vehicle based, at least in part, on the approximate motion primitive.

J: The method of paragraph I, wherein the segment is a first segment associated with a first curvature value, wherein the plurality of points is a first plurality of points, wherein the approximate motion primitive is a first approximate motion primitive, and wherein the curvature value is a first curvature value, the method further comprising: determining a second segment of the reference trajectory, the second segment having a second plurality of points, wherein each point of the second plurality of points is associated with a second curvature value that is opposite the first curvature value; defining a second approximate motion primitive associated with the second segment; and controlling the autonomous vehicle based, at least in part, on the second approximate motion primitive.

K: The method of paragraph I or J, wherein the lateral offset is a cubic polynomial in time, and wherein one or more of the upper bound or the lower bound is based, at least in part, on a maximum lateral offset and a minimum lateral offset.

L: The method of any of paragraphs I-K, wherein the approximate motion primitive is associated with an arc length as an average of the upper bound for the arc length and the lower bound for the arc length.

M: The method of any of paragraphs I-L, wherein a curvature of the segment varies linearly with respect to the arc length of the segment.

N: The method of any of paragraphs I-M, wherein a state of the autonomous vehicle is defined as having the arc length, the lateral offset, an angular offset, and a velocity in a path-centric coordinate system, the method further comprising: determining a subsegment of the segment, the subsegment having a plurality of points associated with velocity having the same sign.

O: The method of any of paragraphs I-N, further comprising: determining a transition point of the reference trajectory where a sign of a trajectory curvature changes from a positive curvature value to a negative curvature value; and determining the segment based at least in part on the transition point of the reference trajectory.

P: A non-transitory computer-readable medium storing instructions that, when executed, cause one or more processors to perform operations comprising: determining a reference trajectory for an autonomous vehicle to follow in an environment; determining a segment of the reference trajectory, the segment having a plurality of points, wherein each point of the plurality of points is associated with a same sign of a curvature; determining an acceleration of the autonomous vehicle; determining a lateral offset of the autonomous vehicle relative to the reference trajectory; determining, based at least in part on the lateral offset, an upper bound for an arc length associated with the segment; determining, based at least in part on the lateral offset, a lower bound for the arc length associated with the segment; defining an approximate motion primitive associated with the segment; and controlling the autonomous vehicle based, at least in part, on the approximate motion primitive.

Q: The non-transitory computer-readable medium of paragraph P, wherein: the lateral offset is a cubic polynomial in time, and one or more of the lower bound or the upper bound is based, at least in part, on a maximum lateral offset and a minimum lateral offset.

R: The non-transitory computer-readable medium of paragraph P or Q, wherein the acceleration is a constant, and wherein the curvature of the segment varies linearly with respect to the arc length of the segment.

S: The non-transitory computer-readable medium of any of paragraphs P-R, wherein an arc length of the approximate motion primitive is based, at least in part, on a heuristic of the lower bound for the arc length and the upper bound for the arc length.

T: The non-transitory computer-readable medium of any of paragraphs P-S, wherein one or more of the upper bound or the lower bound is based, at least in part, on a total distance traveled.

While the example clauses described above are described with respect to one particular implementation, it should be understood that, in the context of this document, the content of the example clauses can also be implemented via a method, device, system, and/or computer-readable medium.

What is claimed is:

1. A method comprising:
   determining a reference trajectory associated with a vehicle in an environment;
   determining a transition point of the reference trajectory, the transition point associated with a change of a sign of a trajectory curvature from a positive curvature value to a negative curvature value;
   determining, based at least in part on the transition point, a segment of the reference trajectory, the segment represented by a plurality of points curving to a first direction;
   determining an acceleration associated with the vehicle;
   determining a lateral offset of the vehicle relative to the reference trajectory;
   determining, based at least in part on one or more of the lateral offset or the acceleration, at least one of:
      an upper bound for an arc length associated with the segment; or
      a lower bound for the arc length associated with the segment;
   determining, from a set of predefined motions, a motion associated with the segment; and
   controlling the vehicle based at least in part on the motion.

2. The method of claim 1, wherein the segment is a first segment associated with a first curvature, wherein the plurality of points is a first plurality of points, and wherein the motion is a first approximate motion primitive, the method further comprising:
   determining a second segment of the reference trajectory, the second segment represented by a second plurality of points curving away from the first direction;
   determining a second approximate motion primitive associated with the second segment; and
   controlling the vehicle further based at least in part on the second approximate motion primitive.

3. The method of claim 1, wherein the lateral offset is represented by a cubic polynomial, and wherein one or more of the upper bound or the lower bound is based, at least in part, on at least one of a maximum lateral offset or a minimum lateral offset.

4. The method of claim 1, wherein the arc length is a first arc length, and wherein the motion is associated with a second arc length based at least in part on an average of the upper bound for the arc length and the lower bound for the arc length.

5. The method of claim 1, wherein a curvature associated with the segment is based at least in part on the arc length of the segment.

6. The method of claim 1, wherein a state of the vehicle is based at least in part on the arc length, the lateral offset, an angular offset, and a velocity in a path-centric coordinate system, the method further comprising:
  determining a subsegment of the segment based at least in part on determining a portion of the segment associated with velocities of a similar direction.

7. One or more non-transitory computer-readable media storing instructions that, when executed, cause one or more processors to perform operations comprising:
  determining a reference trajectory associated with a vehicle in an environment;
  determining a transition point of the reference trajectory, the transition point associated with at least one of a first change of a first sign of a trajectory curvature from a positive curvature value to a negative curvature value or a second change of a second sign of the trajectory curvature from the negative curvature value to the positive curvature value;
  determining, based at least in part on the transition point, a segment of the reference trajectory, the segment represented by a plurality of points having a curvature to a same direction;
  determining an acceleration associated with the vehicle;
  determining a lateral offset associated with the vehicle relative to the reference trajectory;
  determining, based at least in part on the lateral offset or the acceleration, at least one of:
    an upper bound for an arc length associated with the segment; or
    a lower bound for the arc length associated with the segment;
  determining a motion of a set of predefined motions associated with the segment; and
  controlling the vehicle based at least in part on the motion.

8. The one or more non-transitory computer-readable media of claim 7, wherein:
  the lateral offset is represented by a cubic polynomial, and one or more of the lower bound or the upper bound is based, at least in part, on at least one of a maximum lateral offset or a minimum lateral offset.

9. The one or more non-transitory computer-readable media of claim 7, wherein the acceleration is represented as a constant.

10. The one or more non-transitory computer-readable media of claim 7, wherein the curvature associated with the segment is based at least in part on the arc length of the segment.

11. The one or more non-transitory computer-readable media of claim 7, wherein the arc length is a first arc length, and wherein a second arc length of the motion is based, at least in part, on a heuristic associated with at least one of the lower bound for the first arc length or the upper bound for the first arc length.

12. The one or more non-transitory computer-readable media of claim 7, wherein one or more of the upper bound or the lower bound is based, at least in part, on a distance to be traveled.

13. A system comprising:
  one or more processors; and
  one or more non-transitory computer-readable media storing instructions executable by the one or more processors, wherein the instructions, when executed, cause the system to perform operations comprising:
    determining a reference trajectory associated with a vehicle in an environment;
    determining a transition point of the reference trajectory, the transition point associated with a change of a sign of a trajectory curvature from a positive curvature value to a negative curvature value;
    determining, based at least in part on the transition point, a segment of the reference trajectory, the segment represented by a plurality of points having a curvature in a first direction;
    determining an acceleration associated with the vehicle;
    determining a lateral offset associated with the vehicle relative to the reference trajectory;
    determining, based at least in part on the lateral offset or the acceleration, at least one of:
      an upper bound for an arc length associated with the segment; or
      a lower bound for the arc length associated with the segment;
    determining a motion associated with the segment; and
    controlling the vehicle based at least in part on the motion.

14. The system of claim 13, wherein the segment is a first segment associated with a first curvature, wherein the plurality of points is a first plurality of points, wherein the motion is a first approximate motion primitive, and wherein the curvature has a first curvature sign indicative of curving in the first direction, the operations further comprising:
  determining a second segment of the reference trajectory, the second segment represented by a second plurality of points having second curvature sign that is opposite the first curvature sign;
  determining a second approximate motion primitive associated with the second segment; and
  controlling the vehicle further based at least in part on the second approximate motion primitive.

15. The system of claim 13, wherein the lateral offset is represented by a cubic polynomial, and wherein one or more of the upper bound or the lower bound is based, at least in part, on at least one of a maximum lateral offset or a minimum lateral offset.

16. The system of claim 13, wherein the motion is associated with an arc length as an average of the upper bound for the arc length and the lower bound for the arc length.

17. The system of claim 13, wherein a curvature value associated with the segment is based at least in part on the arc length of the segment.

18. The system of claim 13, wherein a state of the vehicle is based at least in part on the arc length, the lateral offset, an angular offset, and a velocity, the operations further comprising:
  determining a subsegment of the segment associated with velocities of the same sign.

* * * * *